United States Patent [19]

Brudnicki

[11] 4,130,051
[45] Dec. 19, 1978

[54] PNEUMATIC AUTOSCHEDULE CABIN PRESSURE CONTROLLER

[75] Inventor: Myron J. Brudnicki, Los Alamitos, Calif.

[73] Assignee: The Garrett Corporation, Los Angeles, Calif.

[21] Appl. No.: 753,409

[22] Filed: Dec. 22, 1976

[51] Int. Cl.² .................................................. B64D 13/00
[52] U.S. Cl. .............................................. 98/1.5; 137/81
[58] Field of Search ............... 98/1.5; 165/15; 244/59; 137/608, 81; 236/49

[56] References Cited

U.S. PATENT DOCUMENTS

| | | | |
|---|---|---|---|
| Re. 24,410 | 12/1957 | Drake | 98/1.5 |
| 2,513,332 | 7/1950 | Kemper | 98/1.5 |
| 2,873,661 | 2/1959 | Fischer | 98/1.5 |
| 2,900,890 | 8/1959 | Fischer et al. | 98/1.5 |
| 3,974,752 | 8/1976 | Burgess et al. | 98/1.5 |

Primary Examiner—John J. Camby
Assistant Examiner—Henry C. Yuen
Attorney, Agent, or Firm—Orville R. Seidner; Joel D. Talcott; Albert J. Miller

[57] ABSTRACT

A control for a compartment fluid pressure regulating system in which the control provides pressure signals to an outflow valve by way of fluid pressure signal transmission means, has a chamber coupled to two fluid pressure sources. The control has fluid flow control means to control the passageways between the chamber and the pressure sources, the flow characteristics of the two flow controls differing.

47 Claims, 5 Drawing Figures

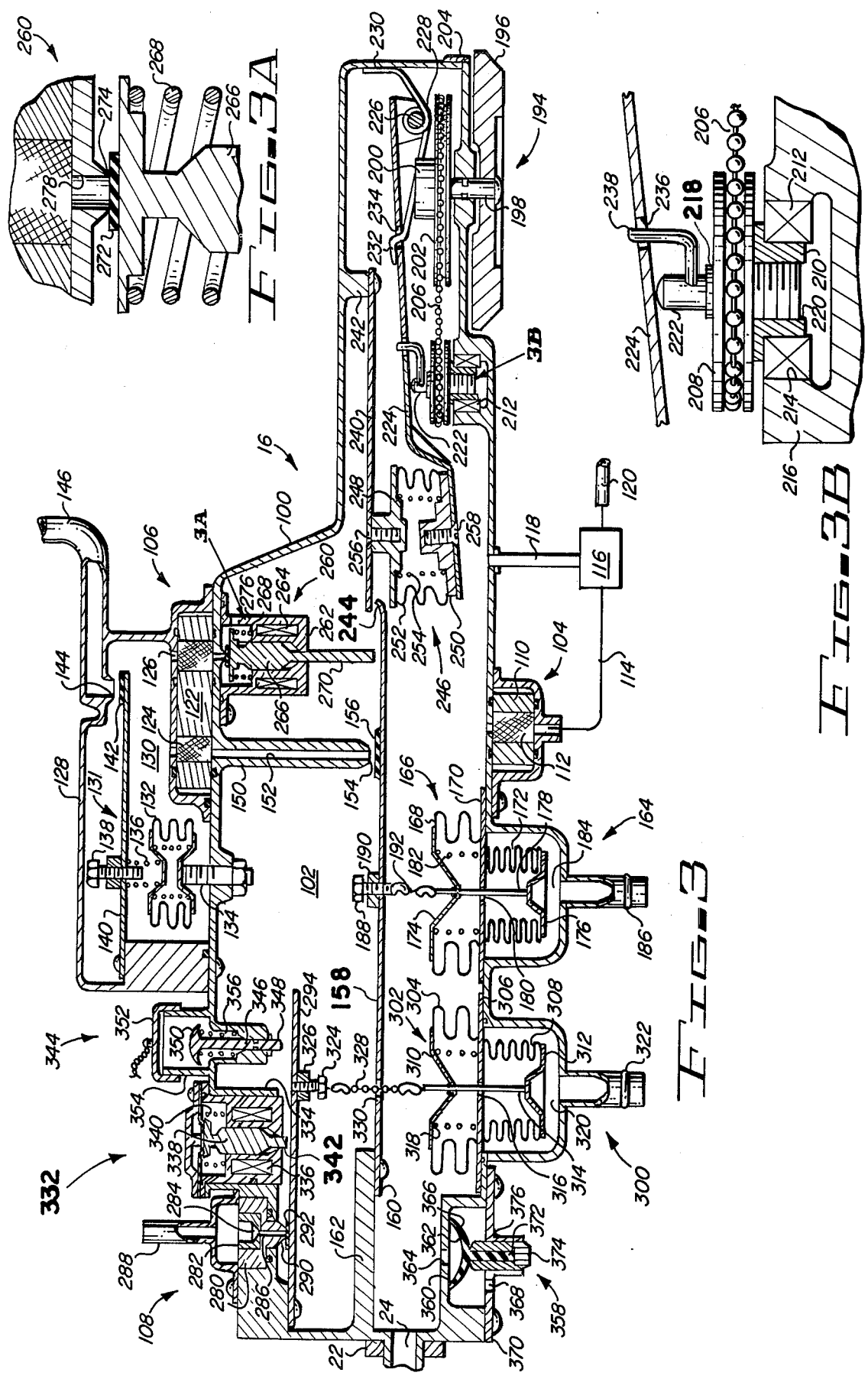

PNEUMATIC AUTOSCHEDULE CABIN PRESSURE CONTROLLER

BACKGROUND OF THE INVENTION

1. Field of the Invention

This invention pertains generally to fluid pressurized compartment regulating systems, and is more particularly concerned with the controller utilized in cabin pressure control systems for pressurized passenger aircraft cabins.

2. Description of the Prior Art

It is well settled in the prior art of fluid pressurization of compartments, as for example the passenger compartments of aircraft, to supply the compartment from a source of fluid under pressure and to exhaust the compartment to the ambient atmosphere by way of an outflow valve. Accepted practice now utilizes supercharged air or bleed air from the compressor stages of a jet engine of the aircraft as the supply source, with cabin pressure control being obtained by controlling the outflow valve by means of a cabin pressure regulator or controller. U.S. Pat. No. 2,669,175 issued Feb. 16, 1954, entitled "Cabin Pressure Control" on an invention by Richard A. Fisher, and assigned to the assignee of the present application, is typical of such a system, wherein an enclosure or cabin 10 is supplied with pressurized air from a pump or supercharger 11. The pressure of the air in the cabin 10 is regulated by a pressure setting mechanism 35 which controls the action of an outflow valve 14 disposed over the outlet opening 12 of the cabin 10.

The mechanism 35 has a control chamber 38 separated from a second backup chamber 37 by a diaphragm 39 which senses the differential of the pressures in the chambers. A rate selector valve 94, controlled by a knob 104, is arranged to vary the rate of flow through a passageway 95 communicating between the two chambers. Cabin air is admitted to the control chamber through a restricted calibrated bleed 42 and is thereafter exhausted through a valve 43 to a region of lower pressure, such as ambient atmosphere.

The valve 43 is subject to the differential of pressures across the diaphragm 39, and to the urging of an adjustable tension spring 85 and an evacuated bellows 70 disposed in the backup chamber 37. The spring 85 is adjustable by a knob 89 to vary the tension thereof. The knobs 89 and 104 are provided for the selection of landing field altitude and rate of change of cabin altitude, respectively.

As noted, the mechanism 35 depends on the bleed of the relatively low (and usually varying) cabin air pressure for the source of control pressure in the control chamber 38.

It was conceived that the control apparatus of the prior art, such as briefly described, could be simplified from fabricating, operational, and functional standpoints if there were only one chamber for control purposes, with the chamber supplied from a readily available higher pressure source of fluid admitted to the chamber at a precisely fixed rate. It was further conceived that if the fluid admission to and exhaust from the control chamber were similarly rate limited, there would be no need for elements for setting rate of change of cabin pressure. Control apparatus as thus broadly conceived would be simplified and compact and would require only minimal additional elements to provide for manual setting of the altitude of the destination airport.

Thus, in both aircraft ascent and descent the cabin altitude change would be rate limited to fixed amounts which would relieve the pilot and crew from additional duties during flight. Their sole concern would be a simple setting by a thumbwheel, for example, which would set the control with destination altitude. As will be seen hereinbelow, the "set-and-forget" procedure can be done prior to takeoff.

Stemming from the concept of a fixed fluid admission rate into the control chamber, as aforesaid, is the unusual advantage of precisely limiting the descent rate of the cabin to an absolute maximum. This is important from the standpoint of passenger comfort and well-being since it is now generally recognized that passenger discomfort (and sometimes acute physical distress) usually accompanies a cabin altitude rate of descent greater than about 300 feet per minute. As a general rule, cabin altitude ascent rate is not of much particular concern at rates up to about 2,000 feet per minute, although it is deemed that under normal circumstances an ascent rate limit of about 550 feet per minute is quite acceptable.

It was further conceived that if the fluid flow through the control chamber were to be scheduled in accordance with the ascent or descent of the aircraft, then the cabin altitude would be reliably scheduled relative to the altitude of the aircraft, and as a result the cabin would be automatically ascended or descended at a rate (between zero and the aforesaid limit rates) proportional to the climb or dive rate of the aircraft.

To this end it was conceived that the flow through the control chamber could be modulated by a metering valve arrangement under the control of a dual-aneroid having one bellows element of a particular effective area subject to ambient air pressure and another bellows element of a different effective area subject to the control chamber pressure.

With these concepts in mind, a "breadboard" model of a control was sketched, laid out and then constructed with a housing about $2\frac{3}{4}$ inches wide by $3\frac{1}{4}$ inches high (as viewed from the front or thumbwheel side) and about $7\frac{3}{4}$ inches from front to back. The housing defined the control chamber which was coupled by a conduit to a pneumatic relay provided for actuation of an outflow valve in the fashion shown described in U.S. Pat. No. 3,974,752 issued Aug. 17, 1975, on an invention by Glenn A. Burgess et al entitled "Pressure Control System."

Contained in the housing of the breadboard version were all the necessary bellows, flow limit restrictions, metering valves, pivoted beams, capillary tubes, solenoid valves and the like which will be described later. Also contained in the housing was an integral pressure regulator of conventional design to regulate the flow of air from the high pressure source in order to provide exactly 5.5 standard cubic centimeters per minute through a precision calibrated restriction means for a purpose described hereinafter. As completed, the internal volume of the controller including the volume of the interface tubing between the outlet supply port of the chamber and the pneumatic relay, consisted of approximately 35 cubic inches. The breadboard model, in an altitude laboratory chamber test for Sabreliner and DC-9 aircraft cabin pressure control systems, performed the following automatic schedules and controls of cabin altitude from lift-off to landing without any need for attention by the pilot or flight crew:

(a) Minimum ΔP for passenger loading and unloading, and also at touchdown after flight;

(b) Ground ΔP for flight prepressurization of the cabin during the takeoff run;

(c) Auto scheduling of the appropriate cabin altitude during all phases of flight.

SUMMARY OF THE INVENTION

Accordingly the present invention has for its principal object the improvement of pressure control systems for pressurized compartments such as aircraft cabins, in particular the improvement of the control mechanism or control apparatus for providing fluid control signals to conventional outflow valve arrangements in the compartment. A particular object is to provide an absolute pressure control apparatus having a control chamber without fluid pressure or fluid source interface with the fluid in the compartment being controlled.

It is a further object to provide control apparatus having a control chamber coupled to a fluid pressure source by passageway means having therein a restriction means of fixed fluid flow characteristics to supply a fixed rate of fluid flow into the control chamber.

It is yet a further object to provide control apparatus having a control chamber coupled through a passageway means to a fluid pressure sink source of pressure lower than that in the chamber, said passageway means having therein a restriction means of fixed fluid flow characteristics to provide a fluid exhaust from the chamber to the lower pressure sink source at a fixed limited rate of fluid flow.

Another object is to provide control apparatus having a control chamber coupled to fluid pressure sources through passageways having restriction means therein of fixed fluid flow characteristics which differ, one from the other, in their fluid flow characteristics, one of the pressure sources being of a higher pressure than that in the chamber, another of the pressure sources being of a pressure lower than that in the chamber.

It is yet another object to provide control apparatus having a control chamber coupled through a passageway means to a fluid pressure source, said passageway means having therein a restriction means of fixed fluid flow characteristics and further having therein a metering valve means for controlling the fluid flow through the passageway from zero rate up to the rate limit of the restriction means. Still another object is to provide manual pressure setting means coupled to the metering valve means. A still further object is to provide aneroid bellows means coupled to the metering valve means.

Other and further objects will be apparent at once to those skilled in the art upon consideration of the drawings when considered in connection with the description thereof hereinbelow.

BRIEF DESCRIPTION OF THE DRAWINGS

FIG. 3 is a schematic illustration of one form of the control embodying the invention; and FIGS. 3A and 3B are enlarged fragmentary sectional views of portions of the control of FIG. 3.

DESCRIPTION OF THE PREFERRED EMBODIMENT

Figure 1:
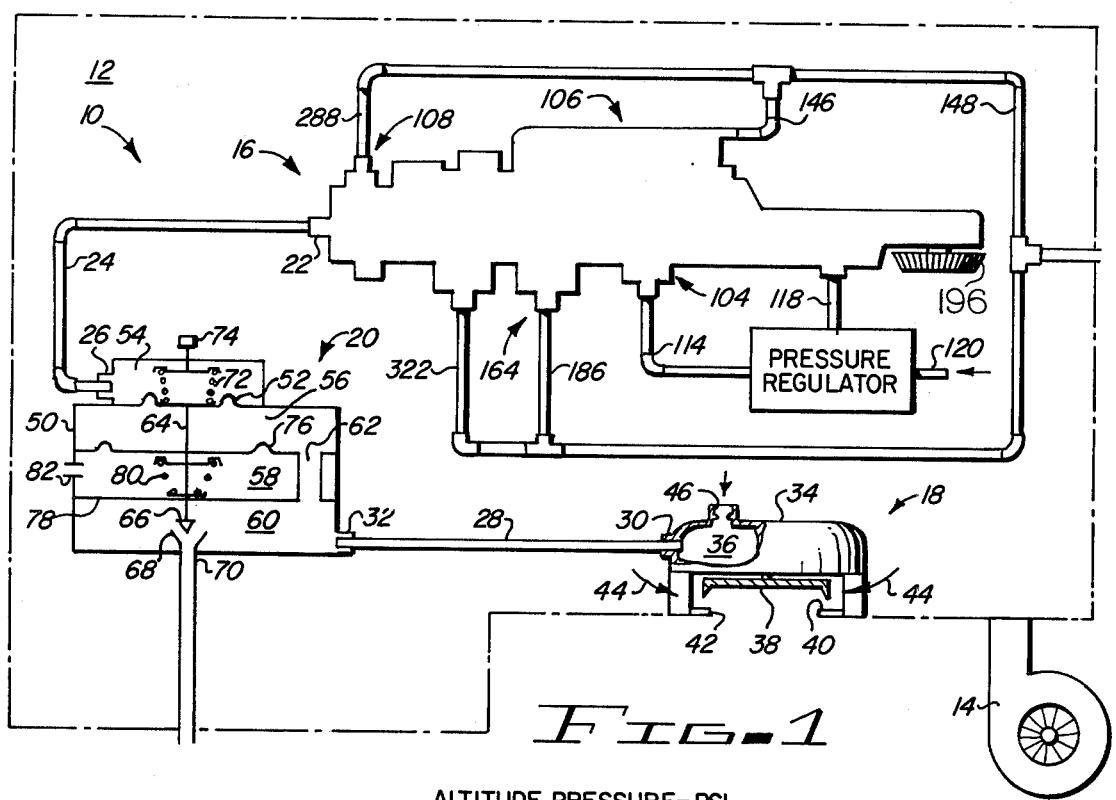
FIG. 1 is a schematic illustration of one form of a compartment pressure control system according to the invention.

Referring to FIG. 1 there is depicted schematically a pressure control system 10 arranged to control the pressure in a compartment 12 such as a cabin in an aircraft (not shown). The compartment 12 is supplied with pressurized air from a source 14 which may be a supercharger or bleed from the engine of the aircraft.

The control system 10 comprises a fluid pressure signal control means 16 and an outflow valve means 18 with signal amplifying means depicted schematically as a pneumatic relay means 20 disposed in the control circuit between the control 16 and the valve 18. The control 16 is provided with a pneumatic signal output port 22 coupled by a conduit 24 to the signal input port 26 of the relay means 20. A pneumatic signal transmission conduit 28 is coupled between the outlet port 30 of the outflow valve 18 and the receiving or inlet port of the relay means 20. An extended discussion of the function of the components in general, and of the control means 16 in particular, will follow the detailed description of the system, the component parts and the elements.

The valve 18 is of the conventional type which is well known in the art, comprising a housing 34 defining a chamber 36 with a movable wall or diaphragm (not shown) which is coupled to a poppet valve member 38 which cooperates with a valve seat 40 to control the flow of fluid from the compartment 12 through the outflow opening 42 in the wall of the compartment 12 as designated generally by the arrows 44. The fluid pressure in the compartment 12 is thus regulated by the positioning of the valve 38 by the movable wall (not shown) which is subject on one face to the pressure within the compartment 12 and on the other face to the fluid pressure in the chamber 36. A light compression spring (not shown) is usually disposed above the movable wall to bias the poppet 38 towards a closed position.

Fluid is supplied to the chamber 36 of the valve 18 through a bleed orifice 46 from a source of fluid at higher pressure, conveniently that of the compartment 12, and is exhausted through the port 30 into the conduit 28.

The pneumatic relay 20 is provided with a housing 50 which defines, in part, with one face of a movable wall 52, a chamber 54 communicating with the conduit 24 through the port 26. The housing 50 also defines, in part, chambers 56, 58 and 60. The movable wall 52 is disposed between the chambers 54 and 56 so as to be subject to the differential of the pressures therebetween with the fluid pressure in the chamber 56 being supplied from the conduit 28 via port 32, the chamber 60 and a passageway 62 communicating between chambers 60 and 56.

The movable wall 52 has affixed to it an actuator rod 64 which extends through the chambers 56, 58 and 60 and terminates at a metering valve element 66 which cooperates with a valve seat element 68 to meter the fluid flow from the chamber 60 through a sink source conduit 70 which is coupled to a source of fluid at a pressure lower than that in the chamber 60. Conveniently, the sink source may be that of the ambient atmosphere external of the compartment 12.

Disposed between the diaphragm 52 and the housing 50 is a light compression spring 72 whose biasing force in the direction of closing movement of the metering valve 66 may be adjusted by a knob 74.

That portion of the relay as thus far described will be seen by those skilled in the art as a simple pneumatic relay wherein variations of the pressure in the chamber 54 as signalled by the control means 16 through the conduit 24, and as sensed by the diaphragm 52, will result in opening or closing movements of the poppet valve member 38 of the outflow valve 18 to effect greater or lesser flow from the compartment 12 and thus regulate its pressure in that manner.

The additional structure of the relay now to be described, provides an increase of gain of the system while still maintaining a high degree of stability, which results in a preferred system.

As noted, the chamber 56 is defined in part by the housing 50 and further in part by the lower face of the movable wall 52 and the upper face of a movable wall 76. The chamber 58 is defined, as noted, by the housing 50, in part, the lower face of the movable wall 76 and a fixed wall 78. A light spring 80 biases the movable wall 76, which is coupled to the actuating rod 64, upwardly away from the fixed wall 78 and hence biases the metering valve 66 away from its seat 68 against the biasing force of the spring 72. The fixed wall 78 forms a dynamic seal with the actuating rod 64 which passes therethrough, in order to prevent escape of high pressure fluid from the chamber 58 into the chamber 60.

An inlet port 82 establishes a communication between the compartment 12 and the chamber 58 of the relay 20 so that the movable wall 76 senses the differential between pressures in the compartment 12 and the chamber 36 in the outflow valve 18. Preferably, the effective area of the movable wall 76 is of the order of four times the effective area of the movable wall 52.

It will be noted that the pressure in the chamber 54 is established by the controller 16. During steady state operation, pressures in the chambers 54, 56 and 60 are balanced against the biasing forces of the spring 72 and 80, and the respective chamber pressures on the effective areas of movable walls 52 and 76 to control the outflow valve head pressure in the chamber 36 to a fixed offset from the controlled pressure established in the chamber 54 by the controller 16.

With any increase in cabin pressure, as might occur with increased compartment air inflow, for example, the pressure increase would be sensed by the movable wall 76, overcoming the force of spring 72 and moving the metering valve 66 to a more open position. This would reduce the head pressure in the chamber 36 of the outflow valve 18 and cause the movable wall or diaphragm therein (not shown) to move the poppet valve member 38 to a more open position to relieve the increasing pressure in the compartment 12.

Simultaneously with the pressure reduction in the chamber 60 is a pressure reduction in the passageway 62 and the chamber 56 which is sensed by both movable walls 52 and 76. The effect on the wall 76 is to further increase the overcoming force on the spring 72, but the effect on the wall 52 is to generate a force assisting that of the spring 72 to partly negate the overcoming force by the wall 76.

The result of all of the aforesaid actions and interactions provides a fast responding outflow valve with rapid increases in compartment pressure while being compensated sufficiently to obtain pressure control stability. The relay means also works in a comparable manner in the case of decreasing compartment pressure which may be the result of a decrease in compartment inflow.

Referring now to FIG. 3, the fluid pressure signal control means 16 is shown as comprising a housing 100 defining a chamber 102. The housing 100 is provided with port means 104, 106 and 108 communicating with the chamber 102. The port means 104 provides a chamber space wherein is disposed a through-flow body 110 having therein a fluid flow restriction means 112 to provide a precisely calibrated fluid flow into the chamber 102 from a constant pressure source conduit 114 coupled to a conventional fluid pressure regulator 116, the reference chamber of which (not shown) may be coupled to the control chamber 102 by a conduit 118, for example, the regulator inlet being coupled to a source of higher pressure (not shown) by a conduit 120. In the alternative, the reference chamber of the regulator 116 may be coupled to communicate with the interior of the compartment 12. The regulator 116 is conventional and well known in all respects and need not be described in detail.

The fluid flow restriction means 112 may be of the conventional type formed as an orificed embouchure in the passageway between the output of the regulator 116 through the conduit 114 into the chamber 102. Preferably, however, the means 112 is formed as a precision sintered metal body which will provide an almost infinite number of lengthy, very small cross-section, tortuous passageways to establish a precisely metered fluid flow therethrough. In the aforesaid "breadboard" model, as noted, the means 112 was fabricated to meter exactly 5.5 sccm (standard cubic centimeters per minute) from a regulated pressure source of 10 psi (pounds per square inch) differential above the pressure in the chamber 102. This particularly specified flow for the particular system assembly under consideration herein, limited the descent of compartment 12 to a maximum of 300 feet per minute. It will be appreciated that for a larger or smaller compartment with other values of compartment air flow, the values of the different fluid flow restriction means employed in the control 16, including the means 112, may vary from those given herein in connection with the breadboard model.

The port means 106 and 108 provide the discharge outlets for the fluid admitted into the chamber 102 by way of the inlet port means 104. Port means 106 comprises a through-flow body 122 disposed within a chambered space in the port means and having disposed therein a pair of fluid flow restriction means 124 and 126 which are similar to the restriction means 112 in the port means 104, but differing therefrom in flow limiting characteristics. Preferably, in the case of pressure regulation of an aircraft, the amount of exhaust flow through the restriction means 124 and 126, simultaneously, at differential of pressure in chamber 102 to ambient pressure equivalent to 200 ft. in altitude, is equal to the inflow through the restriction means 112 (for a purpose which will be brought out hereinbelow). Accordingly, the flow restriction means are calculated and specified to their respective flow characteristics and fabricated to specifications to achieve this result.

The port means 106 further comprises housing walls 128 defining a chamber 130 communicating with the outlets of the restriction means 124 and 126, and having disposed therein an outflow control assembly 131 comprising a convoluted aneroid bellows 132 with one end adjustably secured to a wall of the housing 100 by a stud 134 and the other end free to move in opposition to the force exerted by one end of a light compression spring 136. Disposed opposite to the said other end of the bellows 132 is a locking screw 138 adjustably disposed in a cantilever beam 140, which beam 140 has one end secured to the housing wall 128, the other end of the beam 140 having secured thereon an elastomeric seat 142 disposed adjacent a valve edge 144 formed on the inner end of an outlet passageway conduit 146 forming a part of the outlet port means 106. The conduit 146 is coupled to a sink source of lower pressure provided by a common conduit 148 (see FIG. 1). The sink source may be that of ambient atmosphere or any sink source of pressure lower than that in the control chamber 102.

A capillary element 150, defining a passageway 152, extends from an upper wall of the housing 100 into the chamber 102 with the upper end of the passageway 152 communicating with the inlet of the flow restriction means 124 and the lower end terminating at a metering valve face 154 in communication with the chamber 102. The valve face 154 is cooperative with an adjacent elastomeric seat 156 disposed on a cantilever beam 158 having one end 160 secured to an inwardly extending shelf-like portion 162 of the housing 100. The beam 158 is resiliently self-biased so that the seat 156 and valve face 154 are normally in sealing relationship to prevent fluid flow from the chamber 102 into the passageway 152.

A very important aspect of the invention (function of which is discussed below) is the primary means 164 for modulating the movement of the beam 158 and hence modulating fluid flow from the chamber 102 and the common conduit 148 via the passageway 152, the restriction means 124, the chamber 130, past the seat 142 and the valve edge 144 and the discharge conduit 146.

The primary means 164 comprises a dual aneroid bellows assembly 166 having one end of a convoluted bellows 168 secured to one face of a plate element 170, and other face of which has secured to it one end of another convoluted bellows 172. The opposite ends of the bellows 168 and 172 are provided with respective caps 174 and 176 secured thereto. A strut 178, disposed through a hole 180 in the plate element 170, interconnects and secures the caps 174 and 176 spaced apart in fixed relationship to provide a sealed inner chamber which is common to the two bellows and is preferably evacuated.

For a purpose disclosed hereinbelow, the preferred ratio of the effective area of the bellows 168 to that of the bellows 172 is of the order of 3.57, and as a consequence the pressure on the exterior surface of the bellows 168 would tend to cause it to collapse, resulting in undesired extension of the bellows 172 and defeating the purpose of the dual-aneroid bellows assembly. To prevent this from occurring, a compression spring 182 is disposed between the plate element 170 and the cap 174.

It will be noted that the larger bellows 168 is disposed to have its exterior surface subject to the pressure in the chamber 102, whereas the exterior surface of the bellows 172 is subject to the pressure in a chamber 184 which communicates with a conduit 186. The conduit 186 is coupled to the common conduit 148 (see FIG. 1) which, as noted, is a sink source of pressure lower than that of the chamber 102. Preferably, in the case of an aircraft in which the pressure control system 10 serves to regulate the cabin pressure, the sink source with which the common conduit 148 communicates is that of the ambient atmosphere outside the cabin.

A self-locking screw 188 is threadably disposed in a boss 190 on the beam 158 substantially opposite the center of the cap 174 on the bellows 168. A tension member by way of a small bead chain 192 is secured to the end of the screw 188 and to the center of the cap 174 on its face directly opposite to the face whereat the strut 178 is secured. The tension member 192 serves to transmit modulating movements of the bellows assembly 166 to the beam 158, and hence opening and closing movements of the elastomeric seat 156 away from and towards the metering valve face 154, to thereby modulate the fluid flow from the chamber 102 in accordance with pressures sensed on the exterior surfaces of the bellows 168 and 172. The locking screw 188 serves a calibration purpose to be discussed hereinafter.

Further means for modulating the action of the beam 158 comprises a manually settable means 194 which, in the case of an aircraft cabin pressure control system, constitutes the means by which the pilot or crew member provides the system with directions and instructions as to the destination airfield — more specifically, a setting of destination altitude. In this instance the setting is done by rotating a selector thumbwheel 196 which is secured on a shaft 198 extending through the wall of the housing 100 into the chamber 102. The hub 200 of a chain sprocket 202 is secured on the inner end of the shaft 198. The wheel 196 is provided on its outer periphery with altitude scale marks (not shown) which, upon rotation of the wheel 196, may be caused to appear selectively opposite an index marker 204 disposed on the housing.

The sprocket 202 is coupled by a precision instrument chain 206 to another sprocket 208 (see FIG. 3B) having a hub 210 rotatably disposed within an antifriction bearing means 212 which is fixedly disposed in a shallow bore 214 in a thickened portion 216 of a wall of the housing 100. A jackscrew element 218 is threadably received within the threaded bore 220 of the hub 210, with the rounded end 222 of the jackscrew arranged for contact with a beam 224, one end of which is pivotally disposed on a pivot pin 226 secured to the housing 100. A shaped spring 228 is disposed about the pin 226 with one end 230 bearing against a wall of the housing 100 and the other end 232 looped through a hole 234 in the beam to bear thereagainst and to exert thereupon a counterclockwise force about the pin 226, tending to maintain the beam 224 against the rounded end 222 of the jackscrew 218. The beam 224 is further provided with a hole 236 into which is freely disposed an upturned end of a detent element 238 whose other end is secured to the jackscrew 218 adjacent the rounded end 222 thereof. The detent element 238 thereby prevents the jackscrew 218 from turning with the sprocket 208 when rotary motion is imparted to it by rotation of the sprocket 202 through the chain 206 when the thumbwheel 196 is moved from one altitude setting to another.

A cantilever beam 240 has one end secured to an abutment 242 jutting from the housing 100 into the chamber 102, with the other free end adapted to contact the upturned end 244 of the cantilever beam 158. An aneroid bellows assembly 246 comprises end caps 248 and 250 spaced apart by a convoluted bellows 252 having a compression spring 254 disposed therewithin. The end cap 248 is secured to the underside of the cantilever beam 240, as by a screw 256, and the end cap 250 is secured to the upper side of the pivot beam 224, as by a screw 258. The beam 240 serves to stabilize the aneroid 246 during vibration, acceleration and shock, and also serves to transmit settings of wheel 196 and modulating action of the aneroid to the elastomeric seat 156.

In the arrangement shown, settings of the wheel 196 to the lowest landing field altitude, which may be sea level or below, causes the jackscrew 218 to extend upwardly, whereas settings to the highest landing field altitude, which may be 10,000 feet, cause the jackscrew 218 to retract downwardly. The effect of these actions will be explained below.

A solenoid arrangement 260 is provided to open a restricted passageway from the chamber 102 through the fluid flow restriction means 126 to the sink source of lower pressure via the conduit 146, and also to positively trigger the beam 158 downwardly and to provide free passage for chamber air through the fluid flow restriction means 124 to the sink source. The arrangement 260 comprises a solenoid housing 262 enclosing a solenoid coil 264 disposed around an armature 266. A light compression spring 268 biases the armature 266 upwardly so that a lower extension 270 thereof is normally maintained out of contact with the beam 158. When the solenoid coil 264 is energized, armature extension 270 engages the beam 158 to move the seat 156 away from the valve face 154 and permit free passage of air from the chamber 102 through the restriction means 124 to the sink source. The downward movement of the armature 266 also disengages an elastomeric seat 272 (see FIG. 3A) on the upper end thereof from its closure against a port mouth 274, to permit chamber air to flow through the housing ports 276 and 278 into the restriction means 126 and thence to the sink source.

As aforesaid, the port means 108 provides another outlet for the chamber 102 by means of a through-flow body 280 disposed in a chambered space in the port means 108. A fluid flow restriction means 282 is disposed within the body 280 and defines an orifice 284 which establishes a fluid flow limiting restriction through a passageway 286 in the body 280 from the chamber 102 into a conduit 288 which is coupled to a sink source of lower pressure provided by the common conduit 148 (see FIG. 1).

The orifice 284 is sized sufficiently large so as to preclude any significant buildup of pressure in the chamber 102 (as occasioned by simultaneous inflow through the restriction means 112) when the flow past a valve face 290 and seat 292 is otherwise not impeded. In the "breadboard" embodiment mentioned above, the orifice 284 had a cross-section diameter of about 0.007 inches.

The lower end of the passageway 286 terminates at the metering valve face 290 which is arranged for cooperative fluid flow modulating relationship with the elastomeric seat element 292 disposed on a cantilever beam means 294, one end of which is secured to the housing 100. The beam 294 is resiliently self-biased so that the seat 292 and the valve face 290 are normally in sealing relationship to prevent fluid flow from the chamber 102 into the passageway 286.

Fluid flow from the chamber 102 to the sink source past the valve face 290 and the seat 292 may be modulated in the same fashion but with a different modulation characteristic as was the case of the valve face 154 and seat 156. To this end the movement of the beam 294 is modulated by a secondary means 300 comprising a dual aneroid bellows assembly 302 having one end of a convoluted bellows 304 secured to one face of plate element 306, the other face of which has secured to it one end of another convoluted bellows 308. The opposite ends of the bellows 304 and 308 are provided with respective caps 310 and 312 secured thereto. A strut 314 disposed through a hole 316 in the plate element 306, interconnects and secures the caps 310 and 312 spaced apart in fixed relationship to provide a sealed inner chamber which is common to the two bellows and is preferably evacuated.

For a purpose disclosed hereinbelow, the ratio of the effective area of the bellows 304 to that of the bellows 308 is preferably of the order of 1.73, and as a consequence the pressure on the exterior surface of the bellows 304 would tend to cause it to collapse, resulting in undesired extension of the bellows 308. To prevent this from occurring, a compression spring 318 is disposed between the plate element 306 and the cap 310.

It will be noted that the larger bellows 304 is disposed to have its exterior surface subject to the pressure in the chamber 102 whereas the exterior surface of the bellows 308 is subject to the pressure in a chamber 320 which communicates with a conduit 322. The conduit 322 is coupled to the common conduit 148 (see FIG. 1) which, as previously described, is a sink source.

A self-locking screw 324 is threadably disposed in a boss 326 on the beam 294 substantially opposite the center of the cap 310 on the bellows 304. A tension member, by way of a small bead chain 328, is secured to the end of the screw 324 and passes through a hole 330 in the beam 158 to be secured to the center of the cap 310 on its face directly opposite to the face whereat the strut 314 is secured. The tension member 328 serves to transmit modulating movements of the bellows assembly 302 to the beam 294, and hence opening and closing movements of the elastomeric seat 292 away from and towards the metering valve face 290, to thereby modulate the fluid flow from the chamber 102 in accordance with the pressures sensed on the exterior surfaces of the bellows 304 and 308. The locking screw 324 serves a calibration purpose to be discussed below.

A solenoid arrangement 332 is provided to positively trigger the beam 294 downwardly and provide free passage for chamber air through the fluid flow restriction means 282 to the sink source. The arrangement 332 comprises a solenoid housing 334 enclosing a solenoid coil 336 disposed around an armature 338. A light compression spring 340 biases the armature 338 upwardly so that a lower end 342 thereof is normally maintained out of contact with the beam 294. When the solenoid coil 336 is energized, the armature end 342 engages the beam 294 to move the seat 292 away from the valve face 290 and permit free passage of air from the chamber 102 through the restriction means 282 to the sink source.

A push button control 344 is provided to manually override the solenoid arrangement 332 in the event of loss of electrical power. The control comprises a push button 346 having a stem 348 slideably disposed in the housing 100, with the end of the stem adapted to contact the beam means 294. The head 350 of the push button 346 is disposed in a well in the housing with a cap 352 threadably engaged with the upstanding wall 354 of the well. A compression spring 356 is disposed between the head 350 and the housing to maintain the arrangement normally inactive.

A check valve means 358 is provided to allow the absolute pressure in the chamber 102 to exhaust in the event of an excess pressure differential across an umbrella-shaped elastomeric valve element 360 whose upper concave face 362 is subject to the pressure in the chamber 102 via a port 364 in the housing 100, and whose lower convex face 366 is subject to the ambient pressure on the exterior of the control means 16 via a port 368 in a plate 370 secured to the housing 100. The valve element 360 includes an integral stem 372 fixedly disposed in an adjusting element 374 which is threadably disposed in a neck portion 376 of plate 370. The useful nature of the check valve 358 will be explained below.

OPERATION OF THE INVENTION

Figure 2:
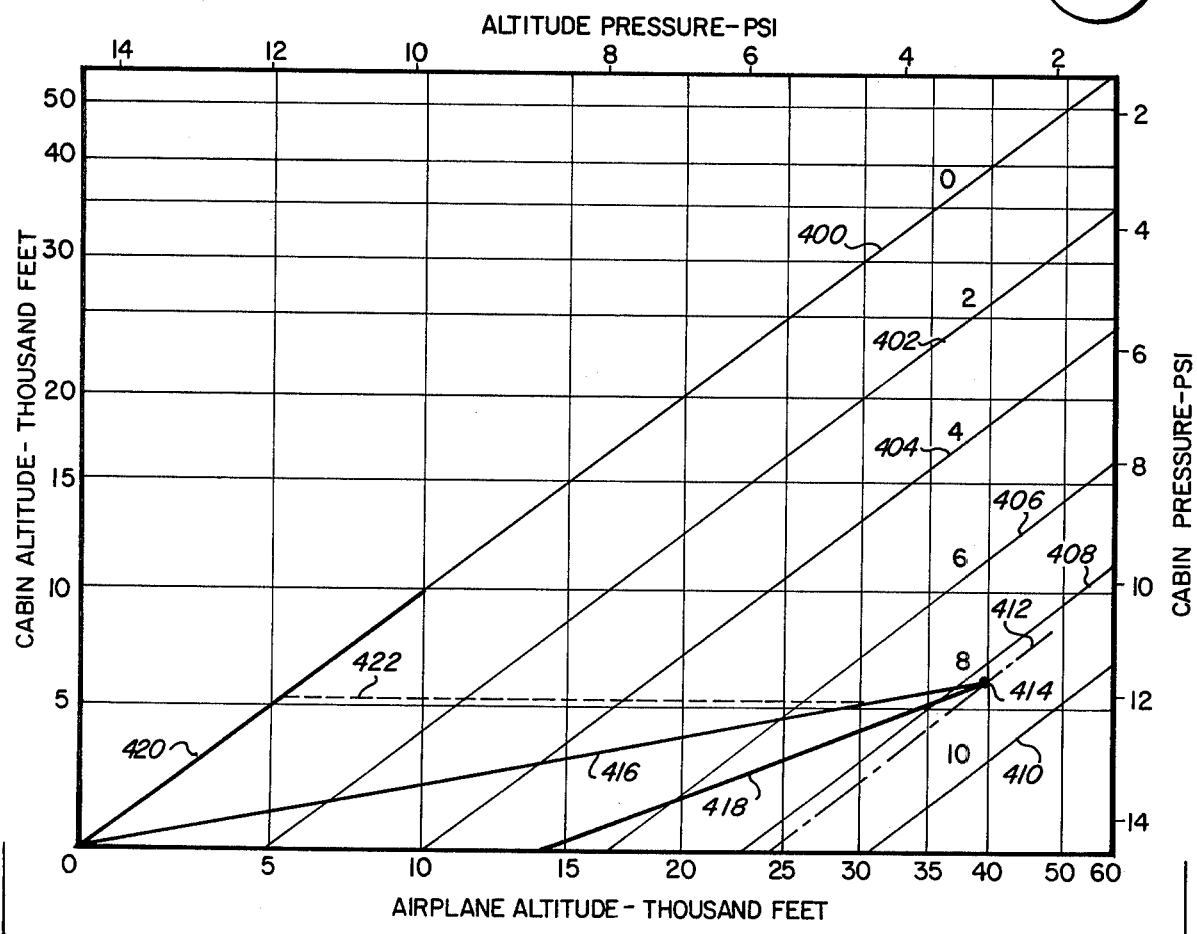
FIG. 2 is a graph showing operational modes of an embodiment of the invention.

Reference is had to FIG. 2, as well as FIGS. 1 and 3, for an understanding of the operation of the system in general, and the components thereof in particular, as the latter cooperate to achieve the objects of the invention.

Referring to FIG. 2 there is shown a graph having cabin altitude (in thousands of feet) as the axis of ordinate, and airplane altitude (likewise in thousands of feet) as the axis of abscissa. The equivalent scales of cabin pressure at altitude and air pressure at altitude are designated at the right and top sides, respectively, of the graph. The origin is represented as zero airplane and cabin altitude, or seal level according to the NACA Standard Atmosphere.

The diagonal line 400 is drawn from the origin of cabin and airplane altitudes at zero through the intersections of the cabin and airplane altitude equivalent figures. As will be obvious, the line 400 necessarily passes through the intersections of the projected equivalent equals of cabin and altitude pressures. Thus, the line 400 represents zero differential between the cabin and altitude pressures. Lines 402, 404, 406, 408 and 410, which are parallel to line 400, represent constant differentials of 2, 4, 6, 8 and 10 psi, respectively, between cabin and altitude pressures.

Aircraft design requirements usually specify the maximum pressure differential of ventilating cabin air over that of the ambient atmosphere to which the cabin may be subjected during flight. In the case here it was considered that an 8.6 psi differential was a realistic figure for the purpose, and to this end there is a dot-dash line 412 which corresponds substantially to this figure. Furthermore, since the usual ceiling altitude for flight of aircraft of this kind is 40,000 ft., a point 414 at the intersection of the 40,000 ft. aircraft altitude line and the differential pressure line 412 establishes a design point which fixes the area ratio sizes of the bellows elements comprised in the bellows assemblies 166 and 302, as will be brought out below.

A line 416 drawn from the point 414 to the graph origin establishes the primary auto schedule of cabin altitude versus airplane altitude. The ratio of the effective areas of the primary auto schedule bellows 168 and 172 was 3.57, as stated above, and this particular ratio establishes the linear equation of the line 416 to be $P_c = 10.58 + 0.28 P_a$, where $P_c$ is the pressure in the cabin and $P_a$ is the ambient pressure on the exterior of the cabin. In this equation the coefficient of $P_a$, namely 0.28, is the reciprocal of the effective-areas-ratio of the bellows 168 and 172, and the arbitrary constant 10.58 is derived to the second decimal point by subtracting 0.28 × 14.7 from 14.7 (14.7 being the sea level pressure in psi at the origin).

Likewise, a line 418 drawn from the point 414 to a point on the abscissa establishes a secondary auto schedule of cabin altitude versus airplane altitude. In this case the intersection on the abscissa is at about 14,000 ft. airplane altitude. The ratio of the effective areas of the secondary auto schedule bellows 304 and 308 was 1.73, as stated above, and this particular ratio establishes the linear equation of the line 418 to be $P_c = 9.76 + 0.578 P_a$. Likewise, in this equation the coefficient of $P_a$, namely 0.578, is the reciprocal of the effective area ratio of the bellows 304 and 308, and the arbitrary constant 9.76 is derived to the second decimal point by subtracting 0.578 × 8.55 from 14.7 (8.55 being the airplane altitude pressure in psi at 14,000 ft. and 14.7 being the sea level pressure in psi, as aforesaid). The secondary auto schedule is also known in the art as the maximum ΔP auto schedule and its function is explained below. The operational modes of the control and system will now be set forth.

MINIMUM ΔP MODE

The mode of "Minimum ΔP" is achieved as a function of the system with the aircraft on the ground during passenger loading and unloading, and also is effected automatically on touch down by closure of the squat switch (not shown) on the landing gear. An operations panel (not shown) for the pilot, or other crew member, is provided with a switch (not shown) which may be, for example, of the double-throw-center-off variety and which is normally open, but which when thrown to a first position completes a circuit from the aircraft battery or other power source through the squat switch to the solenoid coil 336.

With the coil energized, the armature 338 actuates against the beam 294 to displace the seat 292 from the valve face 290 and permit free flow of air from the control chamber 102 through the passageway 286 and thence, as limited by the orifice 284, into the common discharge conduit 148. The chamber 102 is thus maintained essentially at a bare minimum pressure differential above ambient by reason of the fact, as stated above, that flow into the chamber of 5.5 standard cubic centimeters per minute through the fluid flow restriction means 112 is no greater than the outflow through the orifice 284. In the combination shown in FIG. 1, the pressure in the chamber 102 is very nearly equal to but slightly less than the pressure in the actuating chamber 36 of the outflow valve 18, which, in turn, is very nearly equal to but slightly less than the pressure in the cabin 12. The outflow poppet valve 38 is thus wide open. As previously pointed out, the push button control 344 is available to the pilot or other crew member to provide an alternate in the event of loss of power during loading or at touch down.

GROUND ΔP MODE

The operational mode of ground ΔP is for the purpose of slightly prepressurizing the airplane cabin prior to the take-off run to minimize the buffeting and rotational pressure bump which is characteristic of those airplanes that have the cabin air exhaust valves located on the bottom surface of the airplane. The control means 16 performs the slight prepressurization (lowering it in altitude to approximately 200 ft. below the air field altitude) by restricting the exhaust from the control chamber 102 through the flow restriction means 124 and 126. Upon preparing to take off, the aforesaid double-throw switch is thrown to the ground ΔP mode at 80 percent engine throttle. This deenergizes the solenoid coil 336 which closes off the chamber exhaust through the orifice 284 and simultaneously energizes the solenoid coil 264 which thereupon actuates the armature 266 to cause the end of its extension 270 to bear upon the beam 158 and thereby separate the seat 156 from the valve face 154. Chamber air is thus permitted to flow freely through the passageway and thence, as limited by the flow restriction means 124, into the discharge conduit 148. Movement of the armature 266, also uncovers port mouth 274 to permit chamber air to flow freely through the ports 276 and 278 and thence, as limited by the flow restriction means 126, into the conduit 148. As mentioned hereinabove, the combined flow restriction means 124 and 126 are sized to flow characteristics such that their combined exhaust flow is initially slightly less than the inflow at the restriction means 112 so that the chamber 102 tends to become slightly pressurized, to cause the outflow valve poppet 38 to close slightly and thereby increase the cabin pressure slightly until its altitude is about 200 feet below that of the ambient atmosphere. This rate of change of altitude is slightly less than 300 ft. per minute descent.

By the time the cabin altitude has lowered to the negative 200-foot level (as referenced to ambient), the outflow from the control chamber 102 has equalized with the inflow. Hence the chamber pressure has become substantially steady state and the cabin pressure has stabilized. When the aircraft leaves the runway on takeoff, the squat switch on the landing gear opens, whereupon the exhaust flow through the restriction means 126 is cut off and the flow through the restriction means 124 thereafter becomes a function of the modulation of the beam 158 by the primary auto schedule modulating means 164 and the manually settable means 194.

PRIMARY AUTO SCHEDULE MODE

The operational mode of the "Primary Auto Schedule" is for the purpose of effecting cabin pressurization (in aircraft ascent) in accordance with the line 416 on FIG. 2. This is accomplished by the primary modulating means 164 which effects modulation of the cantilever beam 158 to move the seat 156 away from and toward the metering valve face 154 according to the ratio of control chamber and ambient pressures manifest on the bellows 168 and 172, respectively, of the bellows assembly 166. In this manner, the pressure in the control chamber 102 is modulated up or down with increase or decrease of ambient pressure as the aircraft descends or ascends, respectively. If the aircraft is ascending, the cabin pressure will follow the line 416 up at a rate which follows the rate of aircraft climb up to the rate limit established by the flow restriction means 124. Thus, in the primary mode, the rate of cabin climb can vary from zero (for level flight) up to 550 feet per minute, for example, which latter rate is the limit of cabin climb in the primary mode.

If the aircraft is descending, cabin pressure will increase in the same fashion, following down the line 416 at a rate varying between zero and 300 feet per minute as limited by restriction 112. If the cabin might tend to descend faster than 300 feet per minute (when the modulation action has moved the seat 156 to cover the valve face 154 and thus reduce the chamber outflow to zero), the cabin rate of descent is then limited by the inflow through the flow restriction means 112. It is interesting to note at this point that the aneroid assembly 166 of the breadboard model was provided with internal stops (not shown) which limited the travel of the bellows to less than 1/16th of an inch. The operational stroke needed to modulate the valve seat 156 vis-a-vis the valve face 154 is less than 0.005 inches, consequently the total 1/16th stroke of the aneroid assembly is selected in the most elastic and repeatable range of the assembly. The low stroke requirement of the primary auto schedule aneroid allows it to function as a pressure balance device (of negligible stroke and associated spring rate variables) to produce actual test results that are coincident with the theoretical equation $P_c = 10.58 + 0.28P_a$.

LANDING FIELD PRESELECTION MODE

Landing field altitude selection is made by the pilot or crew member using the selector wheel 196. This selection may be made prior to takeoff to minimize the pilot or crew workload. However, in the event the destination is changed, the landing field may be reselected at any time prior to the landing approach without any adverse effects on the passengers and crew. On FIG. 2, the line 420 characterizes the landing field auto schedule mode. Line 420 falls precisely on the graph of the zero differential line 400, and ends at the highest landing field altitude, which, as previously indicated, may be 10,000 feet.

The convoluted bellows 252 of the manually settable means 194 is designed to override the primary modulating means 164 whenever the landing field altitude selection by the thumbwheel 196 is higher than the instant cabin altitude from the primary auto schedule equation $P_c = 10.58 + 0.28P_a$. For example, if the instant airplane altitude is about 12,500 feet and the cabin altitude is about 3,000 feet, then the primary auto schedule bellows 166 will govern cabin pressure if the landing field setting is below 3,000 feet. But if the landing field setting at that instant is reset above 3,000 feet, the landing field auto schedule bellows 252 will override.

Typical cabin pressure scheduling may be understood by reference to line 422 on FIG. 2, wherein it is assumed that the aircraft has taken off from an airport at sea level, and the thumbwheel 196 has been moved to a setting of 5,500 feet for a destination airfield at that altitude. The setting bellows 252 overrides by causing the beam 240 to lower and engage the end 244 of the beam 158, thus effecting displacement of the seat 156 from the valve face 154. The chamber 102 thus drops in pressure from about sea level at the rate established by the restriction means 124 and the cabin ascends (equivalent to cabin pressure drop) at the rate of 550 feet per minute. When cabin altitude reaches about 5,500 feet, the bellows 252 has expanded to a point where it causes the beams 240 and 158 to modulate the chamber air admitted past the seat 156 and the valve face 154, and thence through the passageway 152 and the restriction means 124. The control means 16 thus holds the cabin at 5,500 feet until the aircraft ascends above about 26,000–28,000 feet (intersection of the dashed line 422 with the primary auto schedule line 416). Further ascent of the aircraft will result in the primary modulating bellows assembly 166 overriding the setting bellows 252, and the cabin will ascend from that point along the line 416.

With aircraft descent the control will descend the cabin in accordance with the action of the bellows 166 until the 5,500 ft. airplane altitude is reached, whereafter the setting bellows 252 will be in control at that altitude until the preselected landing field is reached. If flight takes the aircraft below the preselected 5,500 ft. level, the control 16 will follow the descent by allowing ambient air to back flow through the restriction means 124 in conjunction with the simultaneous inflow from the restriction means 112. In this event, the control means 16 is forgiving for errors made in the pilot or crew selection of the landing field altitude.

As can now be seen from the foregoing, control means 16 automatically modulates the cabin ascent and descent rates to anywhere between zero and the rate-limited orificed-rate in accordance with the actual rate of climb or descent of the airplane. For example, assume a flight is to be made from a seal level takeoff field to a preselected sea level landing field. The controller altitude will be modulated by the primary modulating means 164 in close agreement with the primary auto schedule of line 416. Thus, if the airplane climbs slowly, the controller chamber altitude (and hence the cabin altitude) will ascend slowly. If the airplane ascends rapidly, the controller will modulate at a faster ascent rate up to the rate limit established by the restriction means 124.

In the event the airplane climbs extremely fast, at a rate greater than 550 feet per minute, the cabin ascent rate limit of 550 feet per minute of the restriction means 124 will cause the controller altitude to lag below the schedule of the line 416 until the cabin altitude intersects the schedule of the maximum ΔP line 418. This causes the secondary modulating means 300 to automatically override the primary auto schedule as will now be discussed.

SECONDARY AUTO SCHEDULE MODE

This mode, also referred to as the maximum ΔP schedule, follows the line 418 in accordance with the equation $P_c = 9.76 + 0.578P_a$ and operates in the same manner as the primary auto schedule mode, except that its slope is steeper and the rate limit ascent orifice 284, which is modulated by the maximum ΔP schedule, is larger, resulting in ascent rates between zero and 2,000 feet per minute. To this end, the bellows assembly 302 is springloaded by the spring 318 to remain inoperative until an altitude of approximately 14,000 feet is reached by the airplane. As the airplane ascends above this point, the bellows assembly 302 modulates the cantilever beam 294 to open and close the passageway 286 which allows the orifice 284 to exhaust excess controller chamber pressure via the conduit 288. The exhausting of the controller chamber pressure in this manner by the bellows assembly 302, occurs only if the absolute pressure in the controller chamber 102 is on or below the line $P_c = 9.76 + 0.578P_a$. Thus, maximum allowable pressure differential of the airframe is protected by exhausting the controller chamber pressure (and thus the aircraft cabin via the outflow valve or valves) in accordance with the ascent rate of climb of the aircraft. The slope of the maximum ΔP schedule for the breadboard controller was designed to permit the cabin to climb at 2,000 feet per minute while the airplane ascended at 7,500 feet per minute between 14,000 feet and 40,000 feet. A slower airplane ascent rate will automatically slow the controller chamber ascent in accordance with line 418, thus automatic rate control is provided by the maximum ΔP schedule as it is for the primary auto schedule. A different exhaust orifice 284 is used for the maximum ΔP control mode, versus the exhaust through the flow restriction means 124 for the primary auto schedule mode, for fail safe redundancy reasons.

LIMIT CONTROL

The outflow control assembly 131 described hereinabove provides an altitude limit control to prevent altitudes from exceeding a predetermined altitude in the event of malfunction of the primary auto schedule and/or landing field auto schedule control components. The control assembly 131 closes off exhaust flow past the seat 142 and valve edge 144 when the aneroid bellows 132 senses an altitude (from ambient via the common conduit 148 and conduit 146) which is in excess of the calibrated set point. The breadboard controller was calibrated to 14,000 plus or minus 500 feet by means of the locking screw 138.

The aneroid 132 automatically compresses as exhaust flow from the flow restriction means 124 builds up pressure in the flow limit chamber 130, to the calibrated set point of the assembly 131, allowing normal ascent flow to escape to ambient via the conduit 146 while modulating the seat 142 at 14,000 plus or minus 500 feet. A regulated altitude of 14,000 plus or minus 500 feet is maintained in the limit control chamber 130 during all aircraft altitudes in excess of 15,000 feet. Thus the sink source for the restriction means 124 and 126 never exceeds 15,000 feet unless the control chamber 102 is dumped to ambient via the emergency dump modes described below.

EMERGENCY DEPRESSURIZATION

In the event that emergency depressurization of th aircraft's cabin is necessary, dumping of the pressure in the chamber 102 is effected with simultaneous complete opening of the outflow valve means 18. After the emergency depressurization mode is shut off, the control means 16 will descend (i.e. the pressure in the chamber 102 will increase) and the cabin will descend at 300 feet per minute to its proper control mode. Pressure in the control chamer 102 may be dumped in any one or several of the four following methods:

1. Energization of the coil 264 of the solenoid arrangement 260 by a switch (protected by a switch guard to prevent inadvertent operation) which bypasses the circuit through the squat switch on the landing gear. This method will provide a path for access of chamber air for exhaust through the flow restriction means 124 and 126, and cause the controller to ascend at approximately 1,000 feet per minute to the limit control altitude of 14,000 plus or minus 500 feet and remain at the calibrated limit control altitude.

2. Energization of the coil 336 of the solenoid arrangement 332 by a switch (likewise protected by a switch guard and which also bypasses squat switch circuit). This method will provide a path for access of chamber air for exhaust through the orifice 284 and cause the controller to ascend at approximately 2,000 feet per minute, but which slows as the differential pressure across the orifice 284 reduces below sonic.

3. Removal of the screw cap 352 and depression of the push button 346 of the push button control 344. This accomplishes manually (so long as the push button 346 is held depressed) what was done in the above-described second method.

4. Energization of both solenoid coils 264 and 336 by a single switch or by both switches indicated in the first and second methods. As will be evident, this method provides for the most rapid depressurization of the control chamber 102 and hence of the aircraft's cabin.

CHECK VALVE OPERATION

The check valve means 358 is operative in the event of an uncontrolled cabin depressurization which may be the result of the loss of ventilating and pressurizing air inflow from the source 14 coupled with simultaneous high airframe leakage, a possible structural failure such as loss of a window, or a manual override of the outflow valve by the pilot or a crew member. In such an event, the pressure differential across the elastomeric valve element 360 causes it to open in check valve fashion to exhaust air in chamber 102 to ambient, which allows the controller 16 to ascend to an altitude having a pressure within approximately two inches of water of the pressure at the cabin altitude so that when the condition which originally caused the decompressurization is corrected, the controller will return the cabin under automatic rate control of 300 feet per minute to its proper control point. If it were not for the check valve means as described, the controller chamber 102 would have substantially trapped positive air pressure relative to cabin. Consequently, after repair of the condition that had caused the cabin decompression, the cabin would descend at an uncontrolled rate to the original pressure prior to the failure condition, probably causing acute distress to the passengers.

The adjusting element 374 permits a calibrated preload differential pressure at which the valve element 360 will open to allow flow from the controller chamber 102 to the ambient.

It has been noted above that the relay means 20 serves as a pneumatic signal amplifier of the pressure signals in the chamber 102 of the controller 16, with the amplified signals being provided by way of a signal transmission conduit 28 to the control chamber 36 of the outflow valve means 18. Those skilled in the art will recognize that various differentials of pressures alluded to above in this connection can be quite modest in magnitude such that the difference between the pressures in the cabin 12 and in the controller chamber 102 can be of the order of a few inches of water. Accordingly, it will be recognized that when reference is made hereinabove to variation or modulation of the pressure in the control chamber 102, a very nearly equal variation of modulation of cabin pressure accompanies the control chamber excursions.

I claim:

1. Fluid pressure control apparatus, comprising:
   (a) wall means enclosing a chamber for containing a fluid at a pressure to be controlled;
   (b) first and second port means defining respective first and second passageways communicating through said wall means between the interior and exterior of said chamber;
   (c) first and second fluid pressure sources coupled to said first and second port means, respectively,
   said first source being adapted to provide a supply of pressurized fluid at a substantially constant pressure into said first passageway,
   said second source being of pressure lower than said first source;
   (d) first and second fluid flow control means disposed in said first and second passageways, respectively, one of said first and second fluid flow control means comprising metering valve means; and
   (e) movable wall means coupled with said metering valve means for actuation thereof to modulate the flow therethrough,
   said movable wall means being subject to the pressure in said chamber.

2. The apparatus of claim 1 characterized in that said first fluid flow control means comprises a fluid flow restriction means to limit the rate of flow through said first passageway.

3. The apparatus of claim 1 characterized in that said second fluid flow control means comprises a fluid flow restriction means to limit the rate of fluid flow through said second passageway.

4. The apparatus of claim 1 characterized in that said first and second fluid flow control means each comprise first and second fluid flow restriction means, respectively, to limit the rate of fluid flow through said first and second passageways.

5. The apparatus of claim 4 characterized in that said first fluid flow restriction means differs in its fluid flow rate limit from the fluid flow rate limit of said second fluid flow restriction means.

6. The apparatus of claim 1 characterized in that said movable wall means has a first wall portion subject on one face thereof to the pressure in said chamber, and a second wall portion subject on one face thereof to the pressure of one of said first and second fluid pressure sources.

7. The apparatus of claim 6 characterized in that said movable wall means comprises bellows assembly means having first and second bellows elements coupled together,
   said first bellows element differing in effective area from the effective area of said second bellows element,
   said first bellows element corresponding to said first wall portion of said movable wall means and having one of its effective surface areas subject to the pressure in said chamber,
   said second bellows element corresponding to said second wall portion of said movable wall means and having one of its effective surface areas subject to the pressure of said one of said first and second fluid pressure sources.

8. The apparatus of claim 7 characterized in that the effective surface area of said first bellows element subject to the pressure in said chamber is greater than the effective surface area of said second bellows element subject to the pressure of said one of said first and second fluid pressure sources.

9. The apparatus of claim 8 characterized in that said bellows assembly means comprises an aneroid assembly means with the interiors of said first and second bellows element being substantially evacuated.

10. The apparatus of claim 9 characterized in that said one of said first and second fluid pressure sources is said second fluid pressure source.

11. The apparatus of claim 10 characterized in that said one of said first and second fluid flow control means is said second fluid flow control means.

12. The apparatus of claim 1 characterized in that said one of said first and second fluid flow control means further comprises manually settable means coupled with said metering valve means for actuation thereof to modulate the fluid flow therethrough in accordance with the setting of said manually settable means.

13. The apparatus of claim 12 characterized in that said manually settable means comprises pressure responsive means responsive to the fluid pressure in said chamber.

14. The apparatus of claim 13 characterized in that said manually settable means further comprises motion transmission means, and manual selector means coupled with said pressure responsive means through said motion transmission means.

15. The apparatus of claim 14 characterized in that said pressure responsive means comprises aneroid bellows means.

16. The apparatus of claim 12 characterized in that said first fluid flow control means comprises a first fluid flow restriction means to limit the rate of fluid flow through said first passageway.

17. The apparatus of claim 12 characterized in that said second fluid flow control means comprises a second fluid flow restriction means to limit the rate of fluid flow through said second passageway.

18. The apparatus of claim 12 characterized in that said first and second fluid flow control means each comprise first and second fluid flow restriction means, respectively, to limit the rate of fluid flow through said first and second passageways.

19. The apparatus of claim 18 characterized in that said first fluid flow restriction means differs in its fluid flow rate limit from the fluid flow rate limit of said second fluid flow restriction means.

20. The apparatus of claim 19 characterized in that said movable wall means has a first wall portion subject on one face thereof to the pressure in said chamber, and a second wall portion subject on one face thereof to the pressure of one of said first and second fluid flow pressure sources.

21. The apparatus of claim 20 characterized in that said movable wall means comprises bellows assembly means having first and second bellows elements coupled together,
said first bellows element differing in effective area from the effective area of said second bellows element,
said first bellows element corresponding to said first wall portion of said movable wall means and having one of its effective surface areas subject to the fluid pressure in the chamber,
said second bellows element corresponding to said second wall portion of said movable wall means and having one of its effective surface areas subject to the pressure of said one of said first and second fluid pressure sources.

22. The apparatus of claim 21 characterized in that the effective surface area of said first bellows element subject to the pressure in said chamber is greater than the effective surface area of said second bellows element subject to the pressure of said one of said first and second fluid pressure sources.

23. The apparatus of claim 22 characterized in that said bellows assembly means comprises an aneroid assembly means with the interiors of said first and second bellows elements being substantially evacuated.

24. The apparatus of claim 23 characterized in that said one of said first and second fluid pressre sources is said second fluid pressure source.

25. The apparatus of claim 24 characterized in that said one of said first and second fluid flow control means is said second fluid flow control means.

26. A system for the pressure regulation of a fluid in a compartment provided with an inflow source of pressurizing fluid and a fluid outflow opening controlled by an outflow valve coupled to movable wall means responsive to fluid pressure on one face thereof, comprising:
(a) fluid pressure control apparatus having wall means enclosing a control chamber having first and second port means defining respective first and second passageways communicating through said wall means between the interior and exterior of said chamber,
said first and second port means being coupled to first and second fluid pressure sources, respectively, said first fluid pressure source being adapted to provide a supply of pressurized fluid at a substantially constant pressure into said first passageway, and said second fluid pressure source being of pressure lower than said first pressure source,
said apparatus having first and second fluid flow control means disposed in said first and second passageways, respectively,
one of said first and second fluid flow control means comprising metering valve means, and movable wall means coupled with said metering valve means for actuation thereof to modulate the fluid flow therethrough,
said movable wall means being subject to the pressure in said control chamber; and,
(b) fluid pressure signal transmission means coupled between said control chamber and said first pressure responsive face of the movable wall means coupled to the outflow valve controlling the outflow opening of the compartment.

27. The system of claim 26 characterized in that said first fluid control means comprises a fluid flow restriction means to limit the rate of fluid flow through said first passageway.

28. The system of claim 26 characterized in that said second fluid flow control means comprises a fluid flow restriction means to limit the rate of fluid flow through said second passageway.

29. The system of claim 26 characterized in that said first and second fluid flow control means each comprise first and second fluid flow restriction means, respectively, to limit the rate of fluid flow through said first and second passageways.

30. The system of claim 26 characterized in that one of said first and second fluid flow control means further comprises manually settable means coupled with said metering valve means for actuation thereof to modulate the fluid flow therethrough.

31. The system of claim 26 characterized in that said first fluid flow control means comprises a first fluid flow restriction means to limit the rate of fluid flow through said first passageway.

32. The system of claim 26 characterized in that said second fluid flow control means comprises a second fluid flow restriction means to limit the rate of fluid flow through said second passageway.

33. The system of claim 26 characterized in that said first and second fluid flow control means each comprise first and second fluid flow restriction means, respectively, to limit the rate of fluid flow through said first and second passageways.

34. The system of claim 26 characterized in that said one of said first and second fluid pressure sources is said second fluid pressure source,
said one of said first and second fluid flow control means is said second fluid flow control means,
and said second fluid flow control means further comprises second fluid flow restriction means to limit the rate of fluid flow through said second passageway.

35. A system for the pressure regulation of a fluid in a compartment provided with an inflow source of pressurizing fluid and a fluid outflow opening controlled by an outflow valve coupled to movable wall means responsive to a fluid pressure on one face thereof, comprising:
(a) fluid pressure control apparatus having wall means enclosing a control chamber hving first and second port means defining respective first and second passageways communicating through said wall means between the interior and exterior of said chamber, said first and second port means being coupled to first and second fluid pressure sources, respectively, said first source being a supply source to provide a supply of pressurized fluid into said chamber, said second source being a sink source to provide a sink for fluid exhausting from said chamber, said apparatus having first and second fluid flow control means disposed in said first and second passageways, respectively, one of said control means comprising metering valve means adapted to modulate the pressure in said chamber, said one of said control means further comprising fluid pressure sensitive means coupled with said metering valve means and subject to the pressure of one of said first and second pressure sources; and (b) fluid pressure signal transmission means coupled between said control chamber and said fluid pressure responsive face of the movable wall means coupled to the outflow valve controlling the outflow opening of the compartment.

36. Fluid pressure control apparatus, comprising:
(a) wall means enclosing a chamber for containing a fluid at a pressure to be controlled;
(b) first and second port means defining respective first and second passageways communicating through said wall means between the interior and exterior of said chamber;
(c) first and second fluid pressure sources coupled to said first and second port means, respectively, said first source being a supply source to provide a supply of pressurized fluid into said chamber, said second source being a sink source to provide a sink for fluid exhausting from said chamber; and
(d) first and second fluid flow control means disposed in said first and second passageways, respectively,
one of said control means comprising metering valve means adapted to modulate the pressure in said chamber,
said one of said control means further comprising fluid pressure sensitive means coupled with said metering valve means and subject to the pressure of one of said first and second pressure sources.

37. The apparatus of claim 36 characterized in that said fluid pressure sensitive means is also subject to the pressure in said chamber.

38. The apparatus of claim 36 characterized in that said fluid pressure sensitive means comprises an aneroid bellows assembly.

39. The apparatus of claim 37 characterized in that said one of said sources is said sink source.

40. The apparatus of claim 37 characterized in that said fluid pressure sensitive means comprises an aneroid bellows assembly having first and second bellows elements,
one of said bellows elements being subject to the pressure of said one of said first and second pressure sources,
the other of said bellows elements being subject to the pressure of said pressure in said chamber.

41. The apparatus of claim 40 characterized in that the effective area of said one of said bellows elements differs from the effective area of said other of said bellows elements.

42. The apparatus of claim 41 characterized in that the effective area of said other of said bellows elements is greater than the effective area of said one of said bellows elements.

43. The apparatus of claim 42 characterized in that the effective area of said other of said bellows elements is about 3.57 times the effective area of said one of said bellows elements.

44. The apparatus of claim 42 characterized in that the effective area of said other of said bellows elements is about 1.73 times the effective area of said one of said bellows elements.

45. The apparatus of claim 42 characterized in that said one of said control means is said second fluid flow control means.

46. The method of regulation of the fluid pressure in a compartment admitting pressurized fluid through an inlet port and exhausting fluid through an outlet port provided with an outflow valve member formed as a part of an outflow valve means having a chamber defined in part by movable wall means coupled to said valve member for controlling the flow through said outlet port in accordance with fluid pressure control signals made manifest in said valve means chamber, comprising:
(a) providing fluid pressure control apparatus having wall means defining a chamber coupled by fluid pressure signal transmission means to said valve means chamber,
said apparatus chamber wall means being provided with chamber inlet and outlet port means defining inlet and outlet passageways, respectively, communicating through said chamber wall means between the interior and exterior of said apparatus chamber;
(b) coupling supply and sink sources of control fluid pressure with said inlet and outlet port means, respectively,
said supply source providing a supply of pressurized fluid at a substantially constant pressure into said inlet passageway; and
(c) disposing fluid flow control means to control the flow of controlled pressure fluid through said outlet passageway to said sink source.

47. The method of regulation of the fluid pressure in a compartment admitting pressurized fluid through an inlet port and exhausting fluid through an outlet port provided with an outflow valve member formed as a part of an outflow valve means having a chamber defined in part by movable wall means coupled to said valve member for controlling the flow through said outlet port in accordance with fluid pressure control signals made manifest in said valve means chamber, comprising:
(a) providing fluid pressure control apparatus having wall means defining a chamber coupled by fluid pressure signal transmission means to said valve means chamber,
said apparatus chamber wall means being provided with chamber inlet and outlet port means defining inlet and outlet passageways, respectively, communicating through said chamber wall means between the interior and exterior of said apparatus chamber;
(b) coupling supply and sink sources of control fluid pressure with said inlet and outlet port means, respectively; and
(c) disposing fluid flow control means in one of said inlet and outlet passageways,
said control means in said one of said passageways having a first pressure responsive means subject to the pressure in said chamber and a second pressure responsive means subject to the pressure of one of said control fluid sources,
said pressure responsive means being arranged to control the flow of control pressure fluid through said one of said passageways.

* * * * *